United States Patent
Lee et al.

(10) Patent No.: US 11,347,966 B2
(45) Date of Patent: May 31, 2022

(54) ELECTRONIC APPARATUS AND LEARNING METHOD OF ELECTRONIC APPARATUS

(71) Applicant: SAMSUNG ELECTRONICS CO., LTD., Suwon-si (KR)

(72) Inventors: Donghyeon Lee, Suwon-si (KR); Heriberto Cuayahuitl, Lincoln (GB); Seonghan Ryu, Suwon-si (KR); Sungja Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 399 days.

(21) Appl. No.: 16/518,300

(22) Filed: Jul. 22, 2019

(65) Prior Publication Data
US 2020/0026959 A1  Jan. 23, 2020

(30) Foreign Application Priority Data

Jul. 20, 2018 (KR) .................. 10-2018-0084784
Jul. 12, 2019 (KR) .................. 10-2019-0084270

(51) Int. Cl.
*G06N 20/00* (2019.01)
*G06K 9/62* (2022.01)
*G10L 15/16* (2006.01)
*G10L 15/18* (2013.01)
*G06N 3/08* (2006.01)

(52) U.S. Cl.
CPC ......... *G06K 9/6228* (2013.01); *G06K 9/6256* (2013.01); *G06N 3/08* (2013.01); *G06N 20/00* (2019.01); *G10L 15/16* (2013.01); *G10L 15/1822* (2013.01)

(58) Field of Classification Search
CPC ........ G06F 3/018; G06F 8/34; G06F 16/3329; G06F 17/18; G06F 40/30; G06F 40/35; G06F 40/40; G06F 3/04892; G06F 9/44; G06F 40/279; G06F 40/56; G06K 9/6228; G06K 9/6256; G06N 3/006; G06N 3/08; G06N 20/00; G06N 3/004; G09B 19/00; G10L 13/00; G10L 15/16; G10L 15/1822; G10L 15/02; G10L 15/18; G10L 15/22; H04L 25/0254; H04L 63/1416; H04L 63/1441; G16H 50/30; H04M 3/493
USPC .......... 434/262; 704/3, 9, 256, 277; 706/21; 709/219
See application file for complete search history.

(56) References Cited

U.S. PATENT DOCUMENTS

| | | | | |
|---|---|---|---|---|
| 5,257,187 A * | 10/1993 | Suzuki | .................... | G06F 40/55 704/3 |
| 5,293,584 A * | 3/1994 | Brown | .................... | G10L 15/18 704/200 |
| 5,317,510 A * | 5/1994 | Yoshimura | .............. | G06F 40/56 704/9 |
| 6,587,846 B1 * | 7/2003 | LaMuth | ................. | G06N 3/004 706/21 |

(Continued)

FOREIGN PATENT DOCUMENTS

| KR | 10-2010-0056912 A | 5/2010 |
|---|---|---|
| KR | 10-2014-0049151 A | 4/2014 |

(Continued)

*Primary Examiner* — Gerald Gauthier
(74) *Attorney, Agent, or Firm* — Sughrue Mion, PLLC

(57) ABSTRACT

Artificial intelligence for machine learning to provide an optimized response sentence in reply to an input sentence.

20 Claims, 12 Drawing Sheets

(56) References Cited

U.S. PATENT DOCUMENTS

| | | | |
|---|---|---|---|
| 7,962,578 B2* | 6/2011 | Makar | G06F 16/3329 |
| | | | 709/219 |
| 8,676,583 B2* | 3/2014 | Gupta | G10L 15/22 |
| | | | 704/256 |
| 10,396,919 B1* | 8/2019 | O'Shea | G06N 3/0454 |
| 10,546,066 B2* | 1/2020 | Li | G06N 7/005 |
| 10,587,642 B1* | 3/2020 | Herman-Saffar | H04L 63/1416 |
| 10,721,266 B1* | 7/2020 | Herman-Saffar | H04L 63/1416 |
| 10,862,836 B2* | 12/2020 | McGregor, Jr. | H04L 51/32 |
| 11,068,519 B2* | 7/2021 | Duan | H04L 51/02 |
| 11,074,829 B2* | 7/2021 | Zhang | G06N 3/006 |
| 2009/0228264 A1* | 9/2009 | Williams | G06F 16/3344 |
| | | | 704/9 |
| 2015/0302003 A1* | 10/2015 | Yadgar | G06F 40/40 |
| | | | 704/9 |
| 2016/0007905 A1* | 1/2016 | Milner | A61B 5/168 |
| | | | 434/262 |
| 2016/0071517 A1* | 3/2016 | Beaver | G10L 15/22 |
| | | | 704/9 |
| 2016/0078866 A1* | 3/2016 | Gelfenbeyn | G06F 40/247 |
| | | | 704/9 |
| 2016/0179786 A1* | 6/2016 | Clark | G16H 50/20 |
| | | | 704/9 |
| 2017/0109655 A1* | 4/2017 | Miyazaki | G06N 5/02 |
| 2017/0243136 A1* | 8/2017 | Ho Kang | G06N 20/00 |
| 2018/0060301 A1 | 3/2018 | Li et al. | |
| 2019/0114540 A1* | 4/2019 | Lee | G06F 17/18 |
| 2019/0354592 A1* | 11/2019 | Musham | G06F 40/58 |
| 2019/0392926 A1* | 12/2019 | Koh | G10L 15/08 |
| 2020/0026959 A1* | 1/2020 | Lee | G06K 9/6271 |
| 2020/0059558 A1* | 2/2020 | Mazza | H04M 3/5183 |
| 2020/0150780 A1* | 5/2020 | Wu | G06Q 10/107 |
| 2020/0159526 A1* | 5/2020 | Sivadasan | G06F 40/216 |

FOREIGN PATENT DOCUMENTS

| | | |
|---|---|---|
| KR | 10-2015-0089723 A | 8/2015 |
| KR | 10-1851793 B1 | 4/2018 |

* cited by examiner (1)

(2)

(1)

(2)

(1)

(2)

(1)

(2)

(1)

(2)

(1)

(2)

ELECTRONIC APPARATUS AND LEARNING METHOD OF ELECTRONIC APPARATUS

CROSS-REFERENCE TO RELATED APPLICATION(S)

This application is based on and claims priority under 35 U.S.C. § 119 to Korean Patent Application No. 10-2018-0084784, filed on Jul. 20, 2018, in the Korean Intellectual Property Office and Korean Patent Application No. 10-2019-0084270, filed on Jul. 12, 2019, in the Korean Intellectual Property Office, the disclosures of which are incorporated by reference herein in their entireties.

BACKGROUND

Field

Apparatuses and methods consistent with the disclosure relate to an electronic apparatus and a learning method of an electronic apparatus, and more particularly, to an electronic apparatus and a learning method of an electronic apparatus that provide a response sentence to a user based on a reward value for an input sentence based on the input sentence being received from the user.

Description of the Related Art

In recent years, an artificial intelligence system implementing human-level intelligence has been used in various fields. The artificial intelligence system is a system in which a machine performs learning and determination, unlike an existing rule-based smart system. As use of the artificial intelligence system is increased, a recognition rate is improved and output based on the user input may be more accurately provided, and therefore, the existing rule-based smart system has been gradually replaced by a deep learning-based artificial intelligence system.

Artificial intelligence technology includes machine learning (for example, deep learning) and element technologies using the machine learning.

Machine learning is an algorithm technology of classifying and learning features of input data, and the element technology is a technology of using a machine learning algorithm such as deep learning, or the like, and includes technical fields such as linguistic understanding, visual understanding, inference/prediction, knowledge representation, a motion control, and the like.

One example of technologies utilizing machine learning includes a robot system for use in chat and speaking, and the robot system may refer to artificial intelligence having a function to speak or interact with a user via text or voice. A conventional robot system had to use a conversation sentence tagged with a meaning or a keyword to provide a response sentence in response to the conversation sentence of the user. Therefore, because many conversation sentences are used in the robot system, tagging the meaning or the keyword with each of the conversation sentences is difficult.

SUMMARY OF THE INVENTION

Embodiments of the disclosure overcome the above disadvantages and other disadvantages not described above. Also, the disclosure is not required to overcome the disadvantages described above, and an embodiment of the disclosure may not overcome any of the problems described above.

Aspects of the disclosure may include an electronic apparatus implementing artificial intelligence to learn to provide a response sentence to an input sentence of a user using a conversation sentence to which a meaning or a keyword is not tagged, and a learning method thereof.

According to an embodiment of the disclosure, a method of an electronic apparatus providing a response sentence in reply to an input sentence of a user includes: obtaining a plurality of conversation sentences; obtaining a plurality of clusters for the plurality of conversation sentences based on similarity between the plurality of conversation sentences; based on the input sentence, providing the input sentence as input to an artificial intelligence model trained to provide the response sentence in reply to the input sentence and providing a cluster from among the plurality of clusters as output from the artificial intelligence model; providing a conversation sentence from among the plurality of conversation sentences included in the cluster as the response sentence in reply to the input sentence of the user; obtaining a reward value for the response sentence; and updating weight values of the artificial intelligence model based on the reward value to optimize the response sentence provided in reply to the input sentence.

According to another embodiment of the disclosure, an electronic apparatus includes: a memory configured to store computer-readable instructions; and a processor configured to execute the computer-readable instructions control the electronic apparatus to: obtain a plurality of conversation sentences; obtain a plurality of clusters for the plurality of conversation sentences based on similarity between the plurality of conversation sentences; based on an input sentence being input from a user, provide the input sentence as input to an artificial intelligence model trained to provide a response sentence in reply to the input sentence and provide a cluster from among the plurality of clusters as output from the artificial intelligence model; provide a conversation sentence from among the plurality of conversation sentences included in the cluster as the response sentence in reply to the input sentence of the user; obtain a reward value for the response sentence; and update weight values of the artificial intelligence model based on the reward value to optimize the response sentence provided in reply to the input sentence.

According to the diverse embodiments of the disclosure as described above, the electronic apparatus may perform the learning for providing the response sentence for the input sentence to the user in case that the input sentence is obtained from the user without the work of tagging the meaning or the keyword for each of the plurality of conversation sentences.

BRIEF DESCRIPTION OF THE DRAWING FIGURES

The above and/or other aspects of the disclosure will be more apparent by describing certain embodiments of the present disclosure with reference to the accompanying drawings, in which.

DETAILED DESCRIPTION OF THE EMBODIMENTS

Hereinafter, diverse embodiments of the disclosure will be described with reference to the accompanying drawings.

Figure 1:
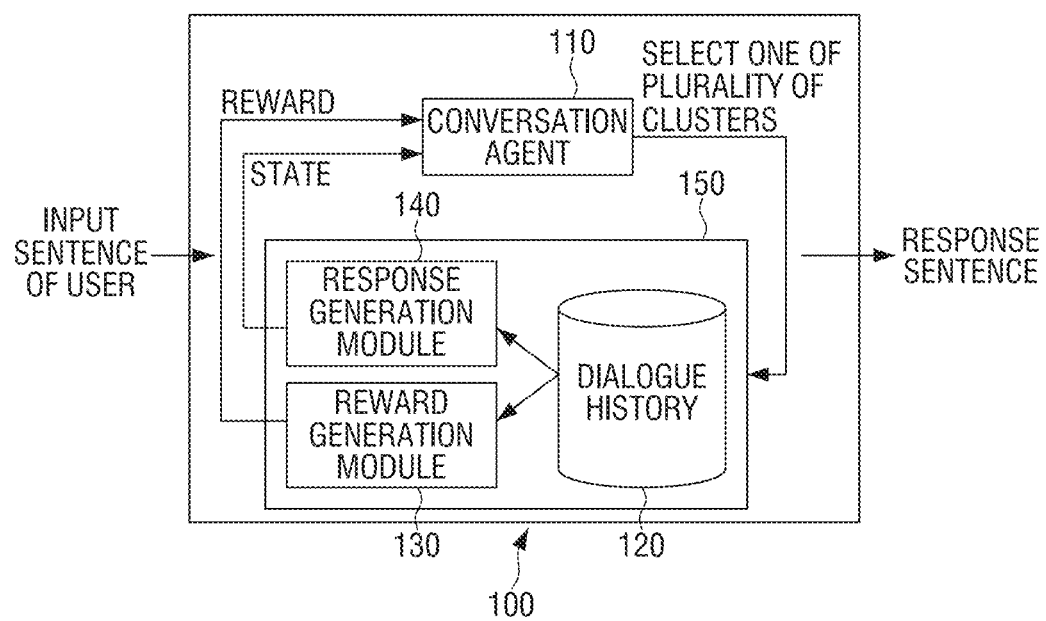
FIG. 1 is a diagram illustrating a method by which an electronic apparatus according to an embodiment of the disclosure provides a response sentence to an input sentence of a user.

FIG. 1 is a diagram illustrating a method by which an electronic apparatus according to an embodiment of the disclosure provides a response sentence in reply to an input sentence of a user.

An electronic apparatus 100 according to the disclosure may include a conversation agent 110 and an environment system (150), and the environment system 150 may include a dialogue history 120, a reward generation module 130, and a response generation module 140.

The electronic apparatus 100 according to the disclosure may provide a response sentence to an input sentence of a user, compare the provided input sentence with an existing dialogue history to determine whether the input sentence is appropriate, and train an artificial intelligence model based on a determined result. That is, the electronic apparatus 100 according to the disclosure may obtain the input sentence of the user, analyze the input sentence, and provide the response sentence according to the input sentence to the user by changing an answer according to a conditional match of a specific sentence, word or the like.

Specifically, the electronic apparatus 100 may obtain a plurality of conversation sentences and obtain a plurality of clusters for the plurality of conversation sentences based on similarity of the plurality of obtained conversation sentences. Specifically, the similarity may be obtained through a data point and a similarity metric given to each of the plurality of conversation sentences as described in Mathematical expressions 2 and 3. The conversation sentences, which are sentences used for dialogue between users, for example, may include input sentences of the user in a messenger application. The plurality of clusters refer to a set of similar conversation sentences, and the above description of the clusters will be described with reference to FIG. 3.

In addition, the electronic apparatus 100 may train an artificial intelligence model according to the disclosure based on the plurality of clusters. The learning of the artificial intelligence model according to the disclosure may be performed through a reinforcement learning method, and reinforcement learning may be performed through an interaction between the conversation agent 110 and the environment system 150. The reinforcement learning is a learning method in which the artificial intelligence model selects an action according to the environment system and performs the learning based on the environment system 150 changed by the action. In case that the environment system 150 is changed in the reinforcement learning, the conversation agent 110 may obtain some reward and the conversation agent 110 may be learned by correcting the action toward receiving better reward.

The environment system 150 may include the dialogue history 120, the reward generation module 130, and the response generation module 140 that includes a conversation sentence to which a meaning or a keyword is not tagged. In case that the input sentence is obtained from the user, the conversation agent 110 may select one of the plurality of clusters to provide the response sentence for the input sentence. In addition, the electronic apparatus 100 may provide one of the conversation sentences included in (belonging to) the selected cluster to the user as the response sentence for the input sentence of the user.

In addition, the reward generation module 130 may compare the dialogue history 120 in the environment system 150 with the response sentence provided by the electronic apparatus to obtain a reward value for the response sentence. The reward generation module 130 may compare the conversation sentences which are pre-stored in the dialogue history 120 with the response sentence to determine whether the response sentence provided to the user is appropriate, and may determine the reward value for the response sentence based on a determination result. For example, the reward generation module 130 may obtain the reward value of +1 in case that the response sentence provided to the user is appropriate for a conversation subject, and may obtain the reward value of −1 in case that the response sentence provided to the user is out of the conversation subject.

In addition, the response generation module 140 may update the dialogue history 120, for example a database, by including the input sentence of the user and the provided response sentence in the existing dialogue history 120. In addition, the response generation module 140 may provide the updated dialogue history to the conversation agent 110 as new state data.

The conversation agent 110 may update weight values of the artificial intelligence model based on the obtained reward value and the updated dialogue history. The learning of the artificial intelligence model according to the disclosure may be repeatedly performed, and as the learning is performed, a performance of the artificial intelligence model is improved, thereby making possible to provide an appropriate response sentence to the user.

Figure 2:
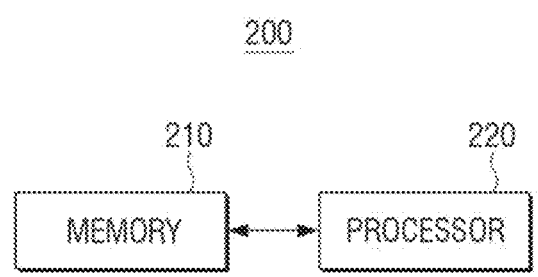
FIG. 2 is a block diagram illustrating a configuration of an electronic apparatus 200 according to an embodiment of the disclosure.

FIG. 2 is a block diagram illustrating a configuration of an electronic apparatus 200 according to an embodiment of the disclosure. The electronic apparatus 200 according to the disclosure may be implemented as at least one server, but this is merely an example and the electronic apparatus 200 may be implemented as, for example, any computing device including a user terminal device, a smartphone, or home appliances.

The electronic apparatus 200 according to an embodiment of the disclosure may include a memory 210 and a processor 220. The components illustrated in FIG. 2 are illustrative diagrams for implementing the embodiments of the disclosure, and appropriate hardware/software configurations understood by skilled in the art may be further included in the electronic apparatus 200.

The memory 210 may store instructions or data related to one or more other components of the electronic apparatus 200. In particular, the memory 210 may be implemented as a non-volatile memory, a volatile memory, a flash memory, a hard disk drive (HDD), a solid state drive (SDD), or the like. The memory 210 is accessed by the processor 220, and readout, writing, correction, deletion, update, and the like of data in the memory 210 may be performed by the processor 220. In the disclosure, a term 'memory' includes the memory 210, a read only memory (ROM) (not illustrated) in the processor 220, a random access memory (RAM) (not illustrated), or a memory card (not illustrated) (for example, a micro secure digital (SD) card or a memory stick) mounted in the electronic apparatus 100. In particular, the memory 210 may store a program for performing an artificial intelligence agent. Here, the artificial intelligence agent is a personalized program for providing various services for the electronic apparatus 200.

In addition, the memory 210 may include a replay memory to perform the learning of the artificial intelligence model according to an embodiment of the disclosure. The replay memory, which is a memory used for the reinforcement learning, may include a state, an action, a reward, and a next state set (s, a, r, s'). According to the disclosure, the state may be a dialogue history, the action may be an action that the electronic apparatus 200 selects one of the plurality of clusters, and the reward may be a reward value for the response sentence.

The functions related to the artificial intelligence according to the disclosure are operated through the processor 220 and the memory 210. The processor 220 may be implemented by a system-on-chip (SoC) or a large scale integration (LSI) in which a processing algorithm is embedded, and may also be implemented in the form of a field programmable gate array (FPGA). The processor 220 may perform various functions by executing computer executable instructions stored in the memory to be described later. The processor 220 may be configured as one or a plurality of processors. Here, one or the plurality of processors may be a general-purpose processor such as a CPU, an AP, or the like, a graphic-dedicated processor such as a GPU, a VPU, or the like, or an artificial intelligence dedicated process such as an NPU. One or the plurality of processors performs a control to process input data according to predefined operating rules or artificial intelligence models stored in the memory 210. The predefined operating rules or artificial intelligence models are characterized by being created through learning. Here, the predefined operating rules or artificial intelligence models created through learning refer to the predefined operating rules or artificial intelligence models of desired characteristics created by applying learning algorithms to a large number of learning data. The learning of the artificial intelligence model may be performed in a device itself in which the artificial intelligence according to the disclosure is performed, or may also be performed through a separate server/system.

The processor 220 according to the disclosure may obtain a plurality of conversation sentences by executing at least one command stored in the memory 210, and may obtain a plurality of clusters for the plurality of conversation sentences based on similarity of the plurality of conversation sentences.

In addition, the processor 220 may obtain the similarity between the plurality of conversation sentences, and may cluster the plurality of conversation sentences based on the obtained similarity to obtain the plurality of clusters. The electronic apparatus 200 according to the disclosure may directly generate and obtain the plurality of clusters, but is not limited thereto and may obtain the plurality of clusters from another server. That is, the electronic apparatus 200 may obtain the plurality of clusters from an external server by receiving the plurality of clusters generated from the external server.

In case that the input sentence is obtained from the user, the processor 220 may input the input sentence to the artificial intelligence model trained for providing the response sentence in reply to the input sentence to select one of the plurality of clusters, and may provide as output one of the conversation sentences belonging to the selected cluster as the response sentence in reply to the input sentence of the user. According to an embodiment of the disclosure, the processor 220 may randomly select one of the conversation sentences belonging to the selected cluster and provide the sentence to the user as the response sentence.

In addition, the processor 220 may obtain a reward value for the provided response sentence and update weight values of the artificial intelligence model based on the reward value. In addition, the processor 220 may obtain a dialogue history, and compare the response sentence with the conversation sentence which is pre-stored in the dialogue history to obtain the reward value for the response sentence.

In addition, the processor 220 may apply the updated weight values to the artificial intelligence model, select one of the clusters based on the artificial intelligence model to which the weight values are applied when the input sentence is obtained from the user, and provide one of the conversation sentences belonging to the selected cluster as the response sentence for the input sentence of the user. That is, whenever the response sentence is provided to the user, the processor 220 may update the dialogue history by including the input sentence of the user and the response sentence in the dialogue history. In addition, the processor 220 may learn the artificial intelligence model based on the updated dialogue history and the reward value for the response sentence, and continuously update the weight values of the artificial intelligence model, thereby making possible to provide an appropriate response sentence to the user.

In addition, the processor 220 may randomly select one of the plurality of clusters with a predetermined probability, and may select a cluster having the maximum output value of the artificial intelligence model for the input sentence when one of the plurality of clusters is not randomly selected. According to an embodiment of the disclosure, the predetermined probability may be 10%. In case that the predetermined probability is 10%, the processor 220 may randomly select one of the plurality of clusters with a probability of 10%, provide one of the conversation sentences belonging to the randomly selected one of the plurality of clusters as the response sentence, and select a cluster having the maximum output value of the artificial intelligence model for the input sentence with a probability of 90%. According to the disclosure, the artificial intelligence model may be a Q-function. Therefore, the processor 220 may select a cluster having the maximum Q-function value for the input sentence, and provide one of the conversation sentences belonging to the selected cluster as the response sentence. Details of the Q-function will be described with reference to Mathematical expression 4.

In addition, the processor 220 may receive the input sentence as voice or text, and may provide the response sentence as voice or text. In case that the input sentence is received as the text, an application to parse the text may be utilized, and in case that the input sentence is received as the voice, an application that converts the voice into the text, and the like may be utilized.

Hereinafter, the disclosure will be described with reference to FIGS. 3 to 6.

Figure 3:
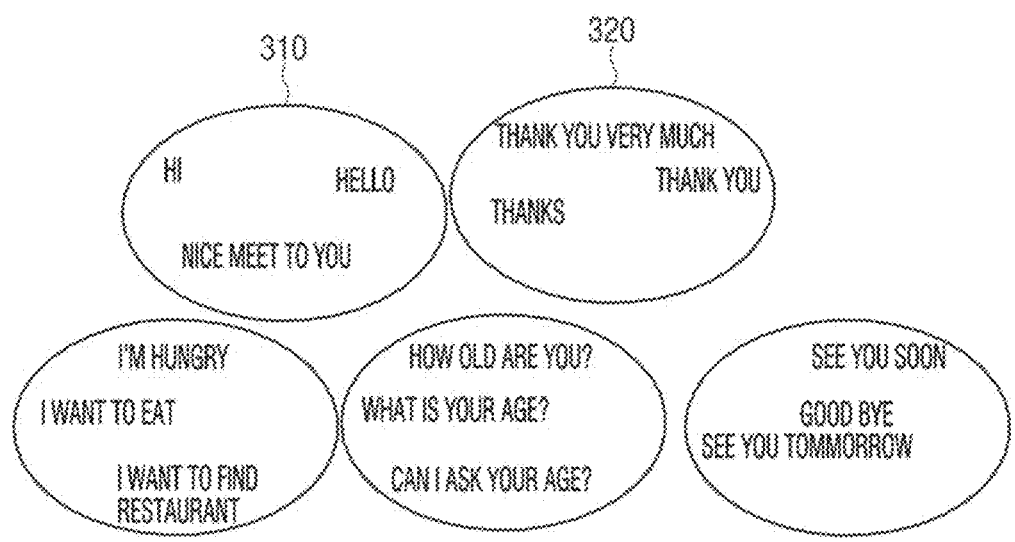
FIG. 3 is a diagram illustrating conversation sentences which are clustered according to an embodiment of the disclosure.

In particular, the electronic apparatus 100 may obtain the plurality of clusters based on the plurality of conversation sentences. That is, as illustrated in FIG. 3, a first cluster 310 may include conversation sentences associated with greetings (Hi. Hello. Nice to meet you.), and a second cluster 320 may include sentences associated with gratitude (Thank you very much. Thank you. Thanks.). According to the disclosure, the plurality of conversation sentences belonging to the cluster may be the conversation sentences to which a meaning or a keyword is not tagged. That is, according to the disclosure, the cost and time of a labeling work, which is a work of tagging the meaning or the keyword to the plurality of conversation sentences, may be reduced.

The electronic apparatus 200 according to the disclosure may perform deep reinforce learning (DRL) for learning of the artificial intelligence model, and may provide the response sentence to the user using the plurality of clusters in which the plurality of conversation sentences are clustered through the artificial intelligence model performing the deep reinforce learning. The plurality of clusters may be obtained for the plurality of conversation sentences based on the similarity of the plurality of conversation sentences. According to an embodiment of the disclosure, the electronic apparatus 200 may obtain k clusters based on a clustering algorithm using a data point $\{x_1, x_2 \ldots x_n\}$ and a similarity metric $d(x_i, x_{i'})$ given to each of the plurality of the conversation sentences, and the number of k may be directly set by the user.

$$x_i = \frac{1}{N_i} \sum_{j=1}^{N_i} c_j \quad \text{[Mathematical expression 1]}$$

According to the disclosure, each data point $x_i$ may be generated for each of the conversation sentences using mean word embedding for each conversation sentence through Mathematical expression 1. $c_j$ is a coefficient vector of j and $N_i$ shows the number of words of a sentence i.

$$d(x_i, x_{i'}) = \sqrt{\sum_{j=1}^{m}(x_i^j - x_{i'}^j)^2} \quad \text{[Mathematical expression 2]}$$

According to the disclosure, a similarity metric $d(x^j_i, x^j_{i'})$ may be generated for m words through Mathematical expression 2.

According to the disclosure, the clusters for the plurality of conversation sentences may be obtained through Mathematical expressions 1 and 2 described above.

In addition, the electronic apparatus 200 may update weight values of the artificial intelligence model based on the reward value for the provided response sentence. Here, an interactive reward value (function) $R_i$ according to the disclosure for updating the weight values is as shown in Mathematical expression 3.

$$R_i = \sum_{j=1}^{N} r_j^i(a) \quad \text{[Mathematical expression 3]}$$

i shows a dialogue between the user and the electronic apparatus, and j relates to the response sentence provided by the electronic apparatus. $r_j^i(a)$ may show +1 in case that the response sentence provided by the electronic apparatus is appropriate for a conversation subject, and may show −1 in case that the response sentence provided by the electronic apparatus is out of the conversation subject.

$$r_j^i(a) = \begin{pmatrix} +1, \text{ if } a \text{ is a human response in dialogue-turn } i, j \\ -1, \text{ if } a \text{ is human but randomly chosen (incoherent)} \end{pmatrix}$$

TABLE 1

| Sentences with reward r = +1 | Sentences with reward r = −1 |
| --- | --- |
| hello what are doing today? | hello what are doing today? |
| i'm good, i just got off work and tired, i have two jobs. | do your cats like candy? |
| i just got done watching a horror movie i rather read, i have read about 20 books this year. | i just got done watching a horror movie |
| | do you have any hobbies? |
| wow! i do love a good horror movie. loving this cooler weather but a good movie is always good. | wow! i do love a good horror movie, loving this cooler weather |
| | good job ! if you live to 100 like me, you will need all that learning. |
| yes! my son is in junior high and i just started letting him watch them i work in the movies as well. | yes! my son is in junior high and i just started letting him watch them |
| | what a nice gesture. i take my dog to compete in agility classes. |

Table 1 is a table for determining a reward value according to the response sentence according to an embodiment of the disclosure.

As shown in Table 1, in case that the response sentence provided by the electronic apparatus 200 is appropriate for the input sentence of the user, the reward value of +1 may be obtained, but in case that the response sentence is inappropriate for the input sentence of the user, the reward value of −1 may be obtained.

In addition, the electronic apparatus 200 may perform the learning through a process of maximizing a Q-function (Q*) showing an accumulated reward value. That is, the electronic apparatus 200 may select a cluster having the maximum Q-function value for the input sentence of the user among the plurality of clusters, and provide one of the conversation sentences belonging to the selected cluster to the user as the response sentence.

The accumulated reward value (Q*) may be as shown in Mathematical expression 4.

$$Q^*(s,a;\theta) = \max_\pi E[r_t + \gamma r_{t+1} + \gamma r_{t+2} + \ldots \\ Cs,a,\pi_\theta] \quad \text{[Mathematical expression 4]}$$

In Mathematical expression 4, r shows a reward as a result of selecting an action a in a state sofa time interval t, γ is a discounting factor, and $Q^*=(s,a;\theta)$, which is an optimal action-value function, is the Q-function. The electronic apparatus 200 may explore a new (state, action) pair in order to improve the reward value, or select an action in a probabilistic manner to utilize an already learned value. During a test process, the electronic apparatus 200 may select the action according to $a^*=\text{argmax}_{a1-1,4}Q^*(s,a;\theta)$.

A learning performing process of the electronic apparatus according to the disclosure will be described with reference to an algorithm 1.

The electronic apparatus 200 may perform reinforcement learning of the artificial intelligence model using generalization of a DQN method [21].

---
Algorithm 1 Chat DQN Learning
---

1: Initialise Deep Q-Networks with replay memory D, dialogue history H, action-value function Q with random weights Θ, and target action-value functions $\hat{Q}$ with $\hat{\Theta} = \Theta$
2: Initialise clustering model from training dialogue data
3: repeat
4:    Sample a training dialogue (human-human sentences)
5:    Append first sentence to dialogue history H
6:    S = word embedding representation of H
7:    repeat
8:       Generate noisy candidate response sentences
9:       A = cluster IDs of candidate response sentences
10:      $a = \begin{cases} \text{rand}_{a \in A} & \text{if random number} \leq \varepsilon \\ \max_{a \in A} Q(s', a'; \hat{\Theta}) & \text{otherwise} \end{cases}$
11:      Execute chosen clustered action a
12:      Observe human-likeness dialogue reward r
13:      Observe environment response (agent's partner)
14:      Append agent and environment responses to H
15:      s = word embedding representation of H
16:      Append transition (s, a, r, s') to D
17:      Sample random minibatch $(s_j, a_j, r_j, s'_j)$ from D
18:      $y_j = \begin{cases} r_j & \text{if final step of episode} \\ r_j + \gamma \max_{a \in A} \hat{Q}(s', a'; \hat{\Theta}) & \text{otherwise} \end{cases}$
19:      Set err = $(y_j - Q(s', a'; \Theta))^2$
20:      Gradient descent step on err with respect to Θ
21:      Reset $\hat{Q} = Q$ every C steps
22:      s ← s'
23:    until s is end of dialogue
24: until convergence Referring to algorithm 1, the electronic apparatus 200 may initialize a replay memory D, a dialogue history H, and a Q-function (Q, $\hat{Q}$), and may sample a learning dialogue from the dialogue history between the humans. When the user enters an input sentence, the dialogue is started, and the electronic apparatus 200 may generate a plurality of clusters including a response sentence for an actual response of a human and a randomly selected response sentence. The plurality of clusters may include the plurality of clustered conversation sentences as described above, and the electronic apparatus 200 may obtain an action of selecting one of the plurality of clusters based on the plurality of clusters. The electronic apparatus 200 may randomly select one of the plurality of clusters with a predetermined probability (∈), and may select a cluster having the maximum output value of the artificial intelligence model for the input sentence when it does not randomly select one of the plurality of clusters. The predetermined probability may be 10% as described above. The obtained action may be conveyed to the environment system S, and the reward (value) may be determined based on the obtained action. In addition, the electronic apparatus 200 may update the dialogue history H by including the response sentence for the input sentence of the user in the dialogue history H. Through the process described above, a set (s, a, r, s') of a state s, an action a, a reward r, a next state s' may be updated in the replay memory D, and a new word embedding may be generated from the dialogue history H by the updated replay memory D. In addition, in order to update weights Θ of the artificial intelligence model, experiment data MB=$(s_j, a_j, r_j, s'_j)$ by a minibatch method may be sampled from the replay memory D. The updating of the weights Θ of the artificial intelligence model may be performed according to Mathematical expression 5.

$$L(\theta_j) = \mathbb{E}_{MB}[r + \gamma \max_a \hat{Q}(s, a; \theta_j) - Q(s, a; \hat{\theta}_j)] \quad [\text{Mathematical expression 5}]$$

The Q-function $\hat{Q}$, which is the target function, and the state s may be updated according to the updating of the weights, and the learning of the artificial intelligence model may be performed by continuously performing the process of updating the weights described above.

Hereinafter, a process of performing an experiment with respect to a learning method of an electronic apparatus according to the disclosure will be described with reference to FIGS. 4 to 6.

Figure 4:
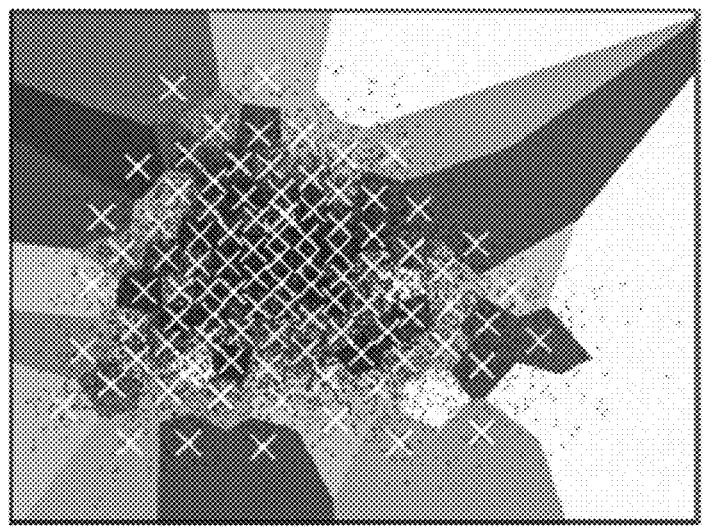
FIG. 4 is a diagram illustrating a plurality of clusters according to an embodiment of the disclosure.

In the experiment of the learning method according to the disclosure, the experiment was performed based on 100 clusters as illustrated in FIG. 4. As the number of clusters increases, the problem of providing the same cluster to the user may be solved, but as the number of clusters increases, the calculation cost may also increase. Therefore, in the experiment according to the disclosure, the experiment was performed using 100 clusters, and in the 100 clusters, conversation sentences representing greetings may be assigned to the same cluster and question sentences representing preferences may be assigned to the same cluster.

FIGS. 5A to 5E are graphs illustrating artificial intelligence learning experiment data according to an embodiment of the disclosure.

In the experiment according to the disclosure, the experiment was performed using 100 learning dialogue histories, and the experiment was also performed using all learning dialogue histories. In the experiment using the 100 learning dialogue histories, 20,000 learnings were performed, and in the experiment using all leaning dialogue histories, 120,000 learnings were performed. In addition, in each experiment, the experiment was performed based on 100 clusters. Referring to FIGS. 5A to 5E, even in case that the electronic apparatus 200 performs an action of providing 100 response sentences with 100 experiments, performance is improved. In the graph, each point may represent one dialogue. That is, each point may represent one response sentence corresponding to the input sentence of the user.

Figure 5A:
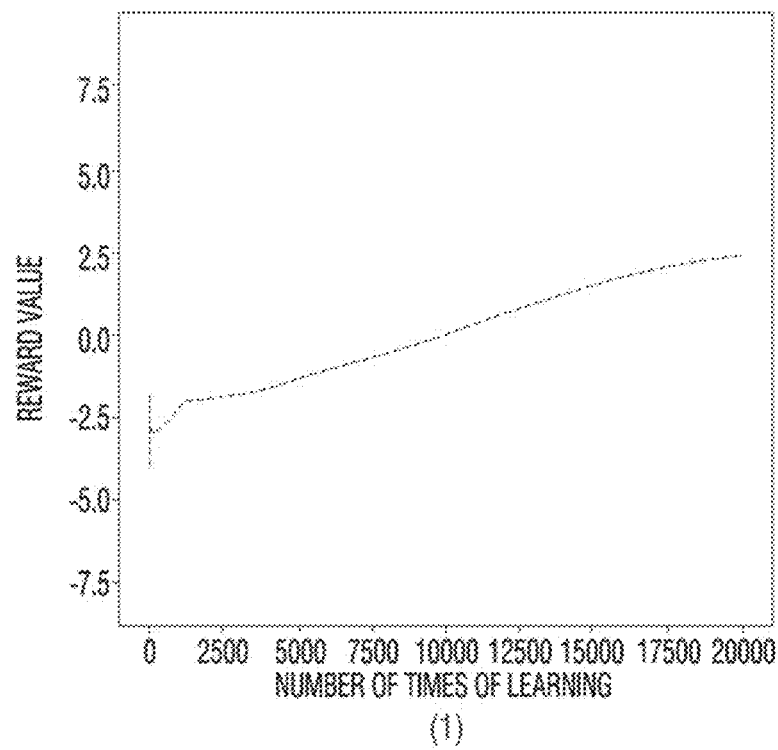
FIG. 5A is a graph illustrating artificial intelligence learning experiment data according to an embodiment of the disclosure.
Figure 5A:
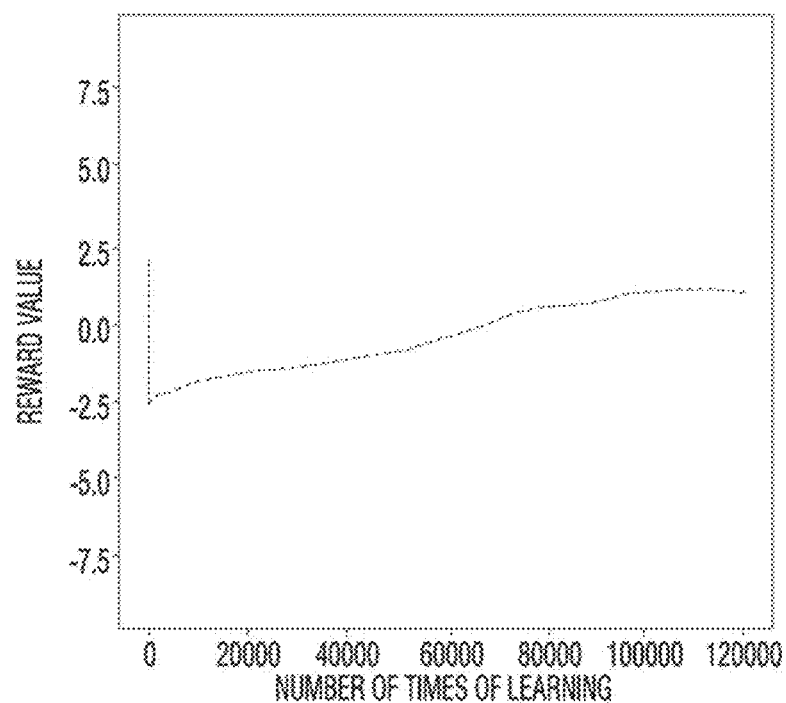
Figure 5B:
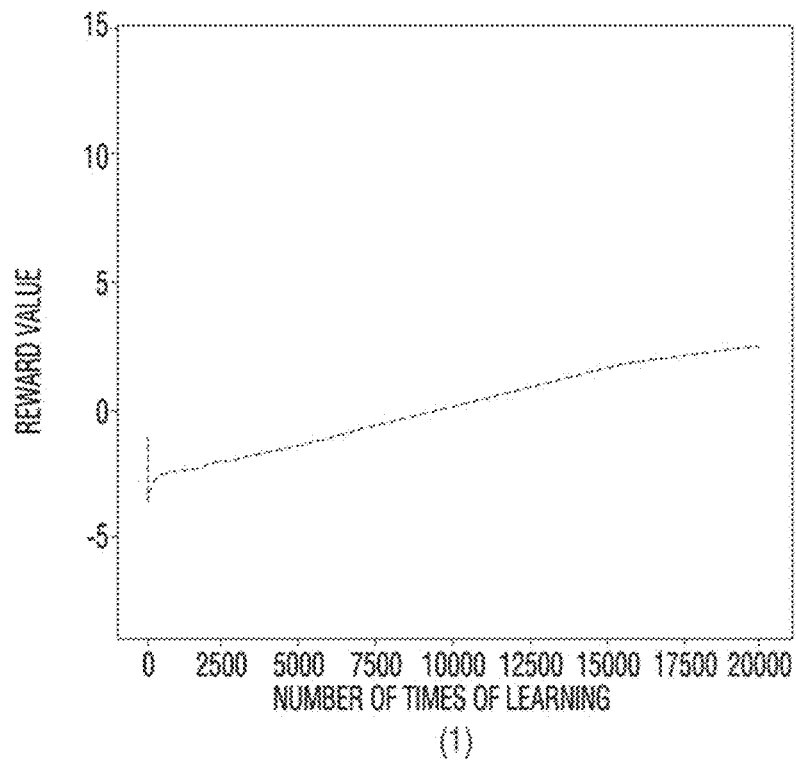
FIG. 5B is a graph illustrating artificial intelligence learning experiment data according to an embodiment of the disclosure.
Figure 5B:
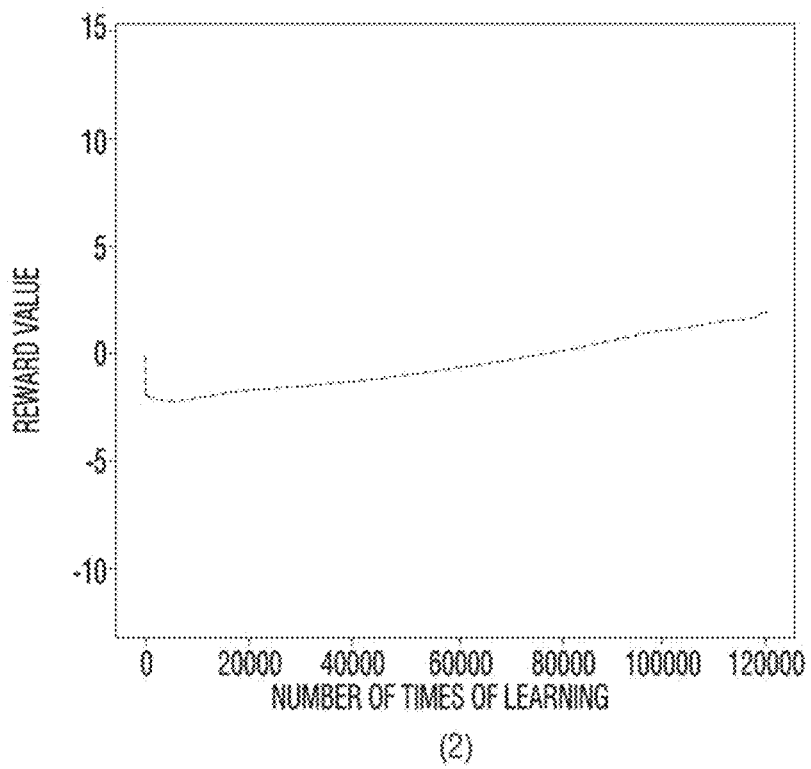
Figure 5C:
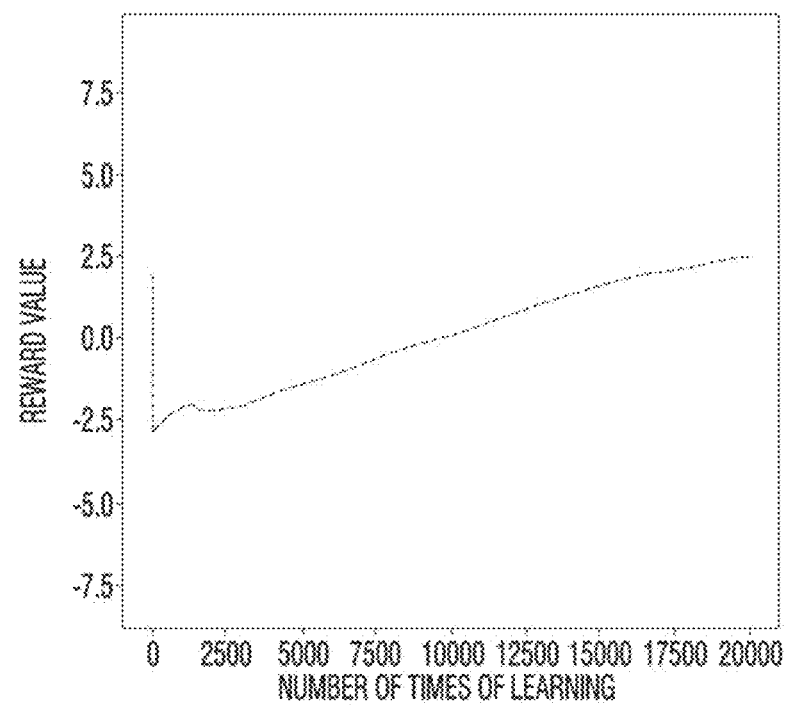
FIG. 5C is a graph illustrating artificial intelligence learning experiment data according to an embodiment of the disclosure.
Figure 5C:
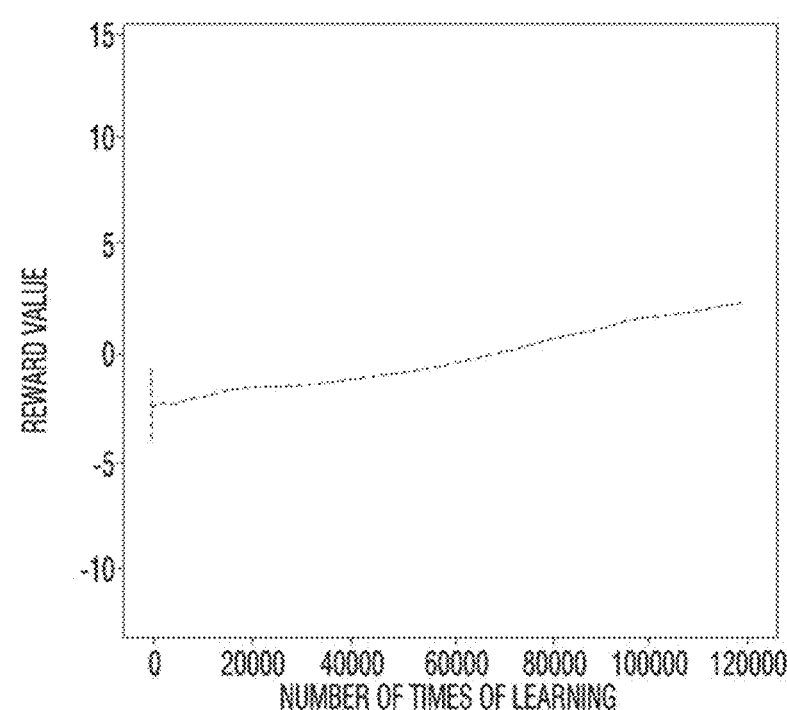
Figure 5D:
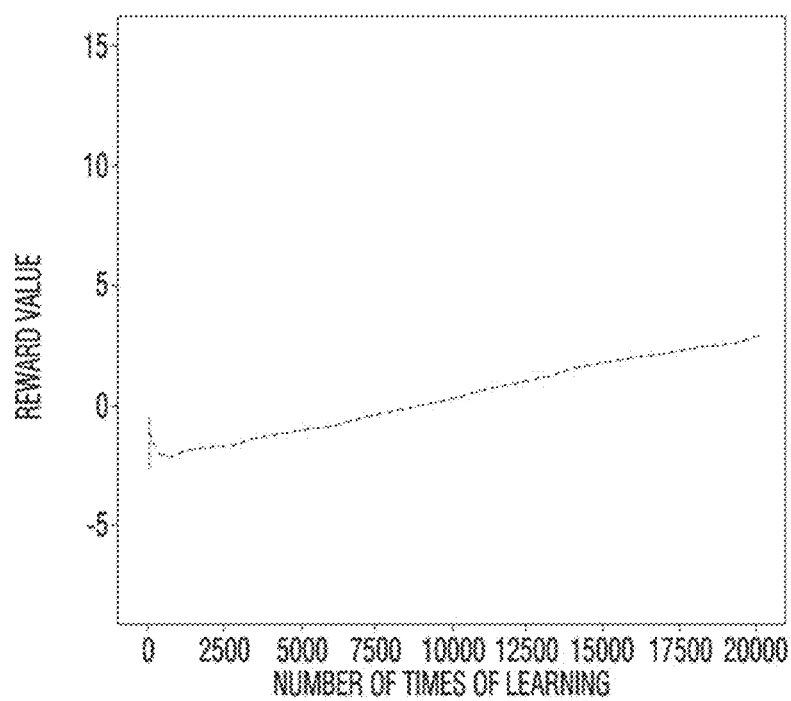
FIG. 5D is a graph illustrating artificial intelligence learning experiment data according to an embodiment of the disclosure.
Figure 5D:
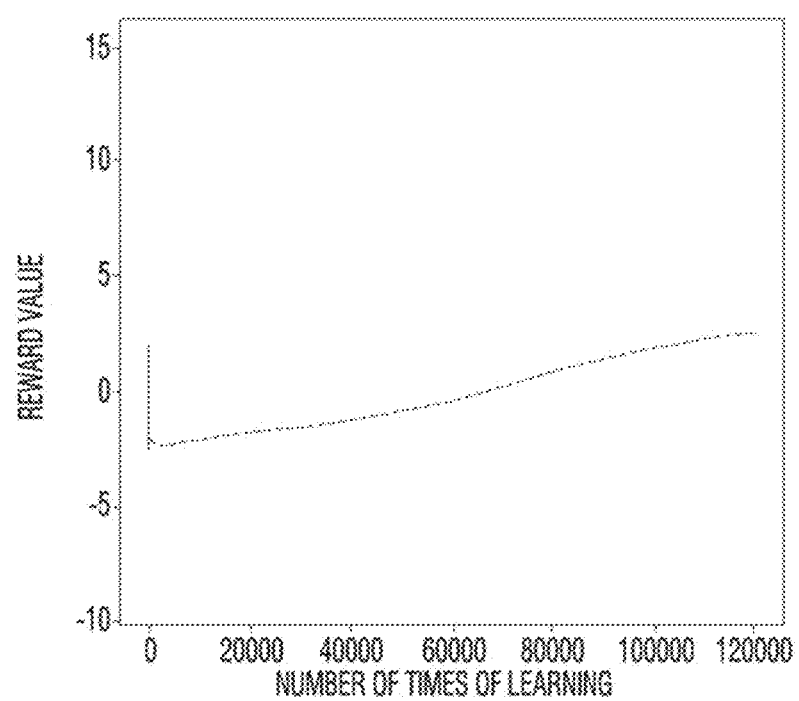
Figure 5E:
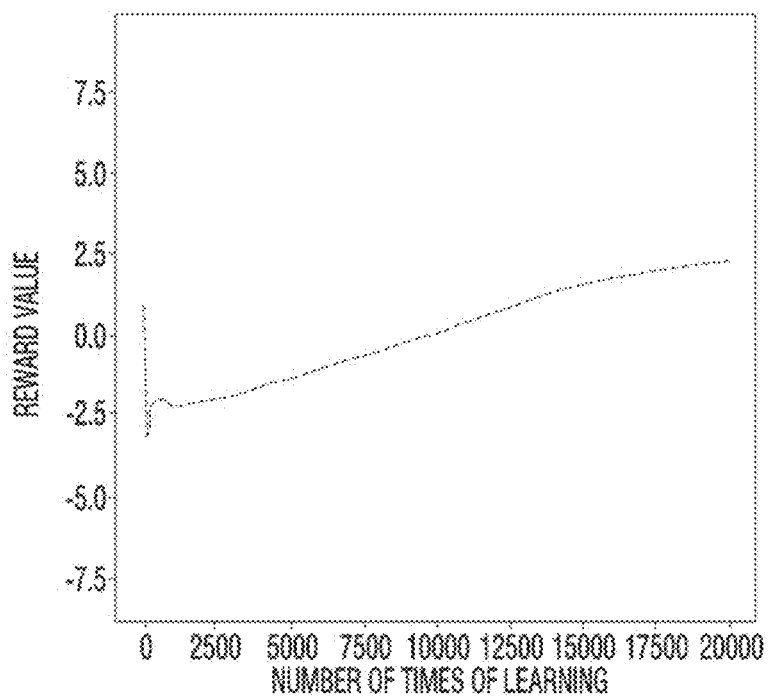
FIG. 5E is a graph illustrating artificial intelligence learning experiment data according to an embodiment of the disclosure.
Figure 5E:
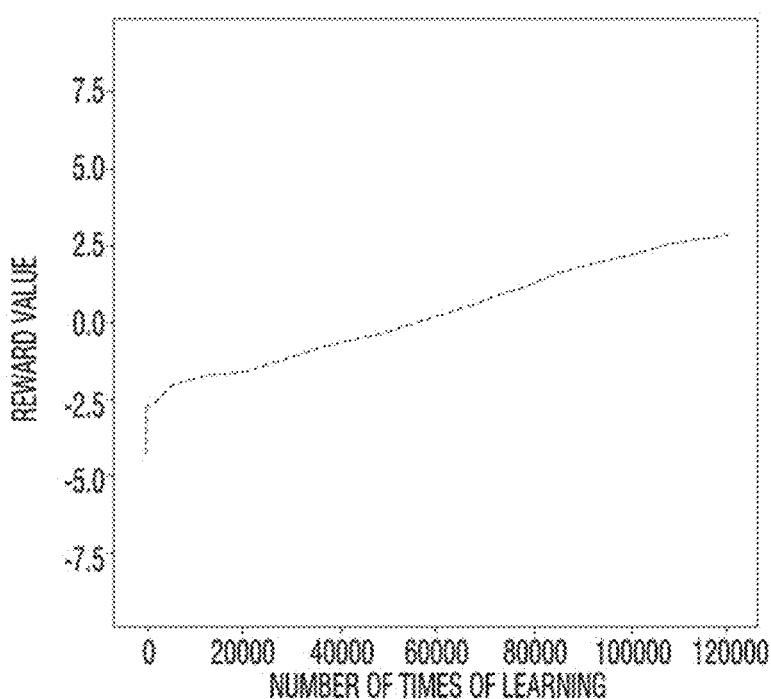

FIG. 5A is a graph illustrating results of an experiment based on 0 to 100 dialogue histories, FIG. 5B is a graph illustrating results of an experiment based on 100 to 200 dialogue histories, FIG. 5C is a graph illustrating results of an experiment based on 200 to 300 dialogue histories, FIG. 5D is a graph illustrating results of an experiment based on 300 to 400 dialogue histories, and FIG. 5E is a graph illustrating results of an experiment based on 400 to 500 dialogue histories.

In each FIG., the top graph (1) illustrates a result obtained by performing 20,000 learnings, and the bottom graph (2) illustrates a result obtained by performing 120,000 learnings. Referring to each graph, as the learning is performed, the accumulated reward value tends to increase.

Figure 6:
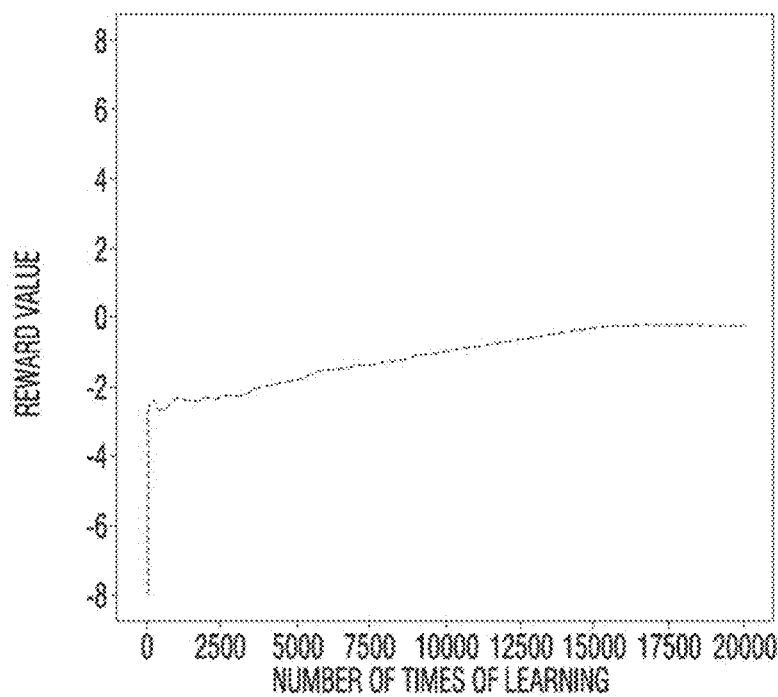
FIG. 6 is a graph illustrating results obtained by performing an experiment using all dialogue histories according to an embodiment of the disclosure.
Figure 6:
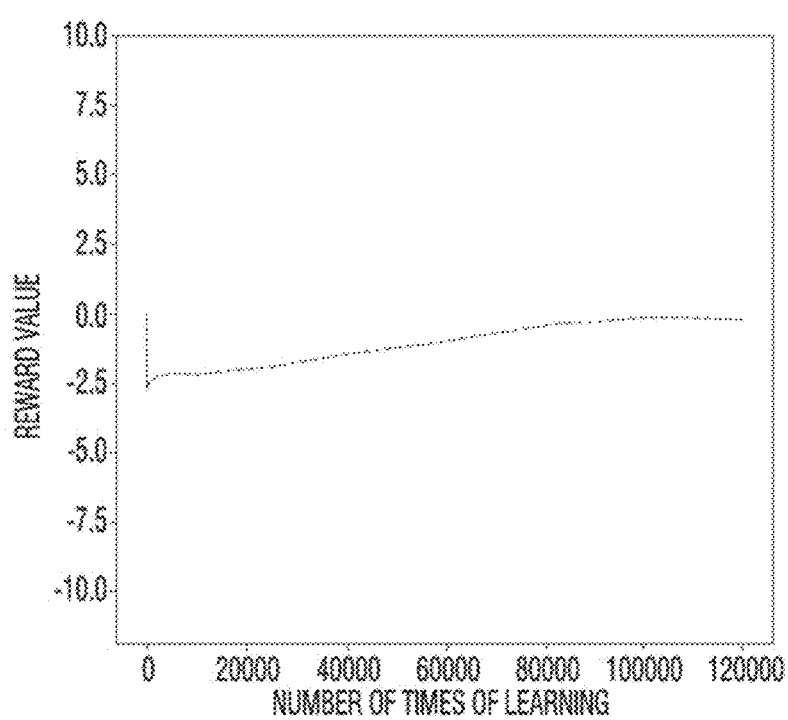

FIG. 6 is a graph illustrating results obtained by performing an experiment using all dialogue histories according to an embodiment of the disclosure.

The graph of FIG. 6 illustrates the result obtained by performing the experiment using all dialogue histories, unlike FIGS. 5A to 5E. Compared with the experiment using some dialogue histories, it may be seen that the performance of artificial intelligence models is better when the experiment is performed using all dialogue histories.

TABLE 2

| Data | |Embedding| = 100 | | |Embedding| = 300 | |
|---|---|---|---|---|
| Splits | Training | Test | Training | Test |
| 0-100 | 2.5049 | −2.0305 | 2.4145 | −0.9488 |
| 100-200 | 2.3676 | −2.1609 | 2.4602 | −0.5761 |
| 200-300 | 1.9599 | −2.0796 | 2.4883 | −0.8967 |
| 300-400 | 1.9288 | −2.2653 | 2.5492 | −0.9488 |
| 400-500 | 2.2941 | −2.1830 | 2.2389 | −1.0070 |
| 500-600 | 2.5941 | −2.0440 | 2.5146 | −2.2715 |
| 0-17877 | −0.4027 | −1.8757 | −0.2885 | −0.4539 |
| Average | 1.8924 | −2.0913 | 2.0539 | −1.0147 |
| Upper Bound | TBF | 7.5942 | TBF | 7.5942 |
| Lower Bound | TBF | −7.7276 | TBF | −7.7276 |
| Random | −2.4139 | −2.5526 | −2.4139 | −2.5526 |

Table 2 is a table illustrating the results obtained by performing 20,000 learnings using 100 and 300 clusters.

Referring to Table 2, the result obtained by performing 20,000 learnings using the 100 clusters (|Embedding|=100), and the result obtained by performing 20,000 learnings using the 300 clusters (|Embedding|=300) are illustrated. Referring to Table 2, performing of the learning using the 300 clusters shows higher performance. In addition, as the dialogue histories (Data Splits) are used, higher performance is obtained.

TABLE 3

| Data | |Embedding| = 100 | | |Embedding| = 300 | |
|---|---|---|---|---|
| Splits | Training | Test | Training | Test |
| 0-100 | 0.7349 | TBF | 1.0104 | −2.3377 |
| 100-200 | 1.1612 | TBF | 1.7355 | −1.6193 |
| 200-300 | 0.8504 | TBF | 2.3953 | −1.3901 |
| 300-400 | 2.4840 | TBF | 2.5090 | −1.5039 |
| 400-500 | 0.8349 | TBF | 2.8329 | −1.6111 |
| 500-600 | 0.7853 | TBF | 2.6007 | −1.5689 |
| 0-17877 | −0.3060 | TBF | −0.2931 | −1.2652 |
| Average | 0.9350 | TBF | 1.8272 | −1.6137 |

Table 3 is a table illustrating the results obtained by performing 120,000 learnings using 100 and 300 clusters.

Referring to Table 3, the result obtained by performing 120,000 learnings using the 100 clusters (|Embedding|=100), and the result obtained by performing 120,000 learnings using the 300 clusters (|Embedding|=300) are illustrated.

Figure 7:
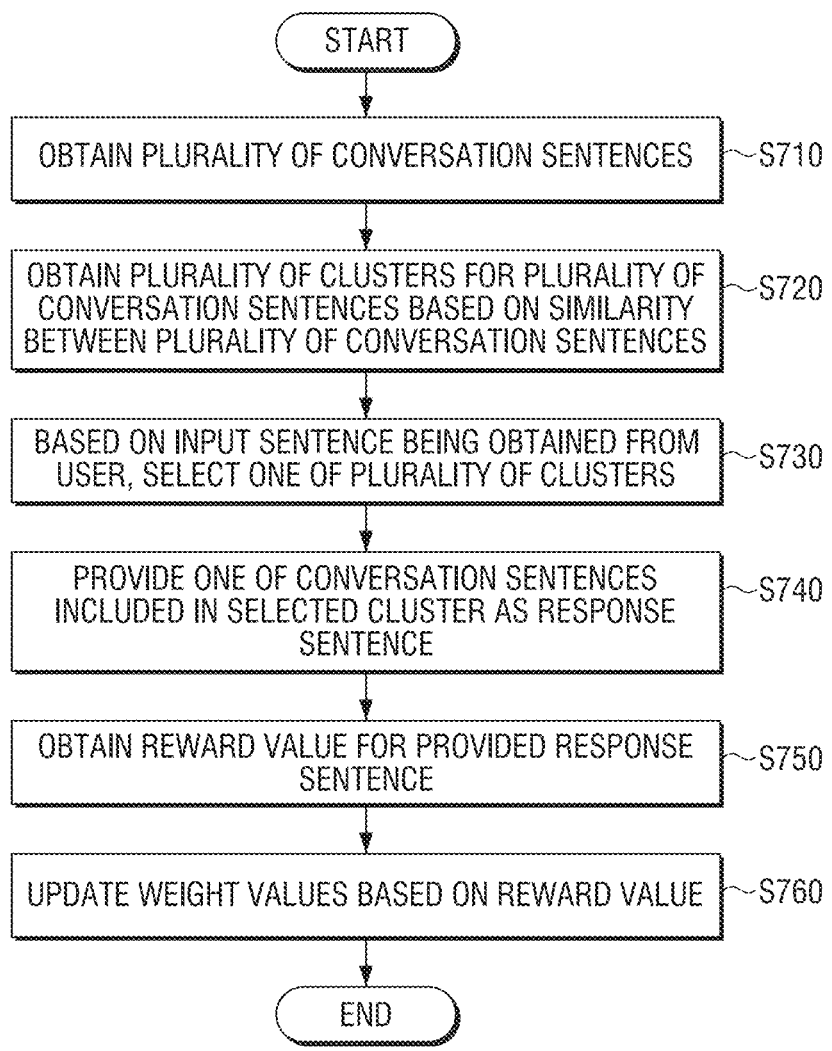
FIG. 7 is a flowchart illustrating a method for providing a response sentence according to an input sentence of a user according to an embodiment of the disclosure.

FIG. 7 is a flowchart for describing a method for providing a response sentence according to an input sentence of a user according to an embodiment of the disclosure.

The electronic apparatus 200 may obtain a plurality of conversation sentences (S710). The plurality of conversation sentences may be sentences such as 'Hi' and 'Thank you very much' as described above with reference to FIG. 3. In addition, the electronic apparatus 200 may obtain a plurality of clusters for the plurality of conversation sentences based on similarity between the plurality of conversation sentences (S720). That is, the electronic apparatus 200 may obtain the similarity between the plurality of conversation sentences, and may cluster the plurality of conversation sentences based on the obtained similarity to obtain the plurality of clusters. In addition, if the electronic apparatus 200 obtains an input sentence from a user, the electronic apparatus 200 may select one of the plurality of clusters (S730). According to an embodiment of the disclosure, the electronic apparatus 200 may randomly select one of the plurality of clusters with a predetermined probability. In case that the electronic apparatus 200 does not randomly select one of the plurality of clusters, the electronic apparatus 200 may select a cluster having the maximum output value of an artificial intelligence model for the input sentence. In addition, the electronic apparatus 200 may provide one of the conversation sentences belonging to the selected cluster as a response sentence (S740). According to an embodiment of the disclosure, the electronic apparatus 200 may randomly select one of the conversation sentences belonging to the selected cluster and provide it as the response sentence. In addition, the electronic apparatus 200 may obtain a reward value for the provided response sentence (S750). According to an embodiment of the disclosure, the reward value may be obtained through Mathematical expression 3. In addition, the electronic apparatus 200 may update weights of the artificial intelligence model based on the obtained reward value (S760). That is, the electronic apparatus 200 may update the weights by learning the artificial intelligence model in a direction in which the reward value for the response sentence for the input sentence of the user is large.

Figure 8:
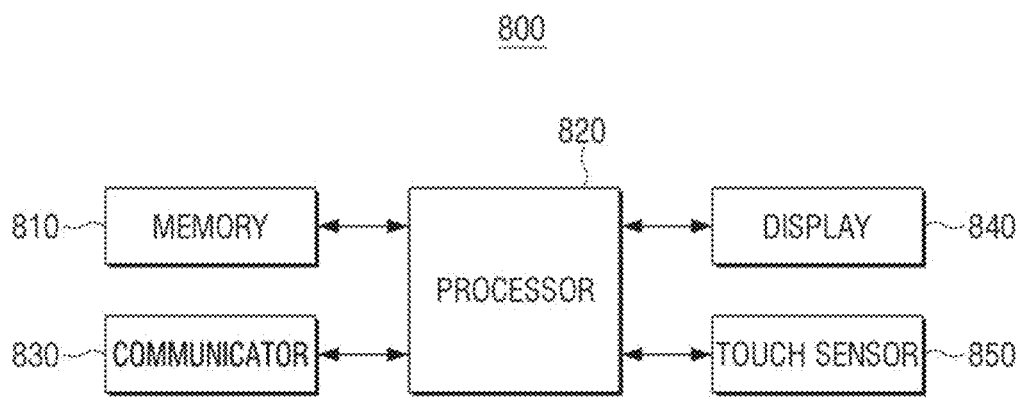
FIG. 8 is a block diagram illustrating a configuration of an electronic apparatus according to an embodiment of the disclosure.

FIG. 8 is a block diagram illustrating a specific configuration of an electronic apparatus according to an embodiment of the disclosure. An electronic apparatus 800 according to the disclosure may be implemented as an electronic apparatus such as a smartphone, and the electronic apparatus 800 may include a memory 810, a processor 820, a communicator 830, a display 840, and a touch sensor 850.

A detailed description for the components overlapped with components illustrated in FIG. 2 among the components illustrated in FIG. 8 will be omitted.

The communicator 830 is a component performing communication with various types of external devices in various types of communication manners. The communicator 830 may include a wireless fidelity (Wi-Fi) chip, a Bluetooth chip, a wireless communication chip, and a near field communication (NFC) chip. The processor 820 may perform communication with various external devices using the communicator 830. In particular, the Wi-Fi chip and the Bluetooth chip perform communication in a Wi-Fi manner and a Bluetooth manner, respectively. In case of using the Wi-Fi chip or the Bluetooth chip, various kinds of connection information such as a service set identifier (SSID), a session key, and the like, are first transmitted and received, communication is connected using the connection information, and various kinds of information may then be transmitted and received. The wireless communication chip means a chip performing communication depending on various communication standards such as Institute of Electrical and Electronics Engineers (IEEE), Zigbee, $3^{rd}$ generation (3G), $3^{rd}$ generation partnership project (3GPP), long term evolution (LTE), and the like. The NFC chip means a chip operating in the NFC manner using a band of 13.56 MHz among various radio frequency identification (RFID) frequency bands such as 135 kHz, 13.56 MHz, 433 MHz, 860 to 960 MHz, 2.45 GHz, and the like.

The communicator 830 may perform communication with an external device and a server, and according to an embodiment of the disclosure, the communicator 830 may obtain a plurality of conversation sentences or a plurality of clusters from the external device or the server. That is, the electronic apparatus 800 may directly generate the plurality of conversation sentences and the plurality of clusters, but is not limited thereto, and the electronic apparatus 800 may obtain the plurality of conversation sentences or the plurality of clusters from the external device or the server through the communicator 830.

The display 840 may display a response sentence provided by the processor 820 to a user. In addition, according to an embodiment of the disclosure, when the response sentence is displayed on the display 840, the user directly evaluates whether the response sentence is appropriate such that a reward value for the response sentence may be obtained. The evaluation for the response sentence of the user may be performed by separately displaying a user interface (UI) on the display 840. The display 840 may be implemented as a liquid crystal display (LCD), an organic light emitting display (OLED), a plasma display panel (PDP), or the like, but is not limited thereto.

The touch sensor 850 may receive an input sentence of the user. That is, the touch sensor 850 may sense a touch input of the user on the display 840. The touch of the user may include a touch input by a finger of the user and a touch input by an electronic pen. In case of the touch input by the finger of the user, the touch sensor 850 may sense the touch input and output an input sentence corresponding to a sensed touch signal. Here, information corresponding to the touch signal may be displayed on the display 840.

Although not illustrated in FIG. 8, in case that the input sentence of the user is input through voice, the electronic apparatus 800 may further include a microphone or the like.

Meanwhile, it is to be understood that the descriptions described above are not limited to specific embodiments, but include various modifications, equivalents, and/or alternatives according to embodiments of the disclosure. Throughout the accompanying drawings, similar components will be denoted by similar reference numerals.

In the disclosure, a term "user" may be a person that uses the electronic apparatus or an apparatus (e.g., an artificial intelligence electronic apparatus) that uses the electronic apparatus.

The artificial intelligence model according to the disclosure may include a plurality of neural network layers. Each layer has a plurality of weight values and a layer calculation is performed by calculating a calculation result of a previous layer and the plurality of weight values. Examples of the neural network include a convolutional neural network (CNN), a deep neural network (DNN), a recurrent neural network (RNN), a restricted boltzmann machine (RBM), a deep belief network (DBN), a bidirectional recurrent deep neural network (BRDNN), and deep Q-networks, and the neural network in the disclosure is not limited to the examples described above except for the case in which it is specified.

A learning algorithm is a method of training a predetermined target device (e.g., a robot) using a plurality of learning data so that the predetermined target device may make a decision or predict itself. Examples of the learning algorithm include supervised learning, unsupervised learning, semi-supervised learning, or reinforcement learning, and the learning algorithm in the disclosure is not limited to the examples described above except for the case in which it is specified.

The electronic apparatus according to the disclosure may perform the learning of the artificial intelligence model through reinforcement learning, unsupervised learning, and deep learning to provide the response sentence for the input sentence of the user.

Meanwhile, according to an embodiment of the disclosure, the diverse embodiments described hereinabove may be implemented by software including instructions that are stored in machine (e.g., a computer) readable storage media. The machine is an apparatus that invokes the stored instructions from the storage media and is operable according to the invoked instructions, and may include the electronic apparatus (e.g., an electronic apparatus A) according to the disclosed embodiments. When the instructions are executed by the processor, the processor may perform functions corresponding to the instructions, either directly or using other components under the control of the processor. The instructions may include codes generated or executed by a compiler or an interpreter. The machine-readable storage media may be provided in the form of non-transitory storage media. Here, the terms 'non-transitory' means that the storage media do not include a signal and is tangible, but do not distinguish whether data is stored semi-permanently or temporarily in the storage media.

In addition, according to an embodiment of the disclosure, the method according to the diverse embodiments described above may be included and provided in a computer program product. The computer program product may be traded as a product between a seller and a purchaser. The computer program product may be distributed in the form of a machine readable storage media (e.g., a compact disc read only memory (CD-ROM)), or online through an application store (e.g., PlayStore™). In case of the online distribution, at least a portion of the computer program product may be at least temporarily stored in a storage medium such as a memory of a server of a manufacturer, a server of an application store, or a relay server, or be temporarily generated.

Each of the components (e.g., modules or programs) according to the diverse embodiments described above may include a single entity or a plurality of entities, and some sub-components of the sub-components described above may be omitted, or other sub-components may be further included in the diverse embodiments. Alternatively or additionally, some components (e.g., modules or programs) may be integrated into one entity to perform the same or similar functions performed by the respective components prior to the integration. The operations performed by the module, the program, or other component, in accordance with the diverse embodiments may be performed in a sequential, parallel, iterative, or heuristic manner, or at least some operations may be executed in a different order or omitted, or other operations may be added.

Although the embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. A method of an electronic apparatus providing a response sentence in reply to an input sentence of a user, the method comprising:
   obtaining a plurality of conversation sentences;
   obtaining a plurality of clusters by clustering the plurality of conversation sentences based on similarity between the plurality of conversation sentences;
   based on the input sentence, providing the input sentence as input to an artificial intelligence model trained to provide the response sentence in reply to the input sentence and obtaining a cluster from among the plurality of clusters as output from the artificial intelligence model;
   providing a conversation sentence from among the plurality of conversation sentences included in the cluster as the response sentence in reply to the input sentence of the user;

obtaining a reward value for the response sentence; and updating weight values of the artificial intelligence model based on the reward value to optimize the response sentence provided in reply to the input sentence.

2. The method as claimed in claim 1, wherein a meaning or a keyword is not tagged to each of the plurality of conversation sentences.

3. The method as claimed in claim 1, wherein obtaining the plurality of clusters comprises: obtaining the similarity between the plurality of conversation sentences; and clustering the plurality of conversation sentences based on the similarity between the plurality of conversation sentences to obtain the plurality of clusters.

4. The method as claimed in claim 1, further comprising obtaining a dialogue history, wherein obtaining the reward value comprises obtaining the reward value by comparing the response sentence with the dialogue history.

5. The method as claimed in claim 4, further comprising storing the input sentence and the response sentence in the dialogue history.

6. The method as claimed in claim 1, wherein updating the weight values comprises obtaining the reward value in response to providing the response sentence; and wherein the updating comprises updating the weight values to maximize an accumulated value of the reward value.

7. The method as claimed in claim 1, further comprising:

applying the updated weight values to the artificial intelligence model;

selecting an updated cluster from among the plurality of clusters in response to the input sentence input to the artificial intelligence model to which the updated weight values are applied; and providing an updated conversation sentence from among the plurality of conversation sentences included in the updated cluster as the response sentence in reply to the input sentence of the user.

8. The method as claimed in claim 7, wherein selecting the cluster from among the plurality of clusters comprises: randomly selecting the cluster from among the plurality of clusters based on a predetermined probability, or selecting the cluster based on a maximum output value of the artificial intelligence model in reply to the input sentence.

9. The method as claimed in claim 1, wherein the input sentence is voice or text, and wherein the providing comprises providing the response sentence as the voice or the text.

10. The method as claimed in claim 1, further comprising:

providing an updated conversation sentence from among the plurality of conversation sentences based on the updated weight values, as the response sentence in reply to the input sentence of the user.

11. An electronic apparatus comprising:

a memory configured to store computer-readable instructions; and a processor configured to execute the computer-readable instructions control the electronic apparatus to:

obtain a plurality of conversation sentences;

obtain a plurality of clusters by clustering the plurality of conversation sentences based on similarity between the plurality of conversation sentences;

based on an input sentence being input from a user, provide the input sentence as input to an artificial intelligence model trained to provide a response sentence in reply to the input sentence and obtain a cluster from among the plurality of clusters as output from the artificial intelligence model;

provide a conversation sentence from among the plurality of conversation sentences included in the cluster as the response sentence in reply to the input sentence of the user;

obtain a reward value for the response sentence; and update weight values of the artificial intelligence model based on the reward value to optimize the response sentence provided in reply to the input sentence.

12. The electronic apparatus as claimed in claim 11, wherein a meaning or a keyword is not tagged to each of the plurality of conversation sentences.

13. The electronic apparatus as claimed in claim 11, wherein the processor is configured to:

obtain the similarity between the plurality of conversation sentences, and cluster the plurality of conversation sentences based on the similarity between the plurality of conversation sentences to obtain the plurality of clusters.

14. The electronic apparatus as claimed in claim 11, wherein the processor is configured to:

obtain a dialogue history, and obtain the reward value for the response sentence by comparing the response sentence with the dialogue history.

15. The electronic apparatus as claimed in claim 14, wherein the processor is configured to store the input sentence and the response sentence in the dialogue history.

16. The electronic apparatus as claimed in claim 11, wherein the processor is configured to:

obtain the reward value in response to providing the response sentence, and update the weight values to maximize an accumulated value of the reward value.

17. The electronic apparatus as claimed in claim 11, wherein the processor is configured to:

apply the updated weight values to the artificial intelligence model, select an updated cluster from among the plurality of clusters in response to the input sentence input to the artificial intelligence model to which the updated weight values are applied, and provide an updated conversation sentence from among the plurality of conversation sentences included in the updated cluster as the response sentence in reply to the input sentence of the user.

18. The electronic apparatus as claimed in claim 17, wherein the processor is configured to:

randomly select the cluster from among the plurality of clusters based on a predetermined probability, or select the cluster based on a maximum output value of the artificial intelligence model in reply to the input sentence.

19. The electronic apparatus as claimed in claim 11, wherein the processor is configured to:

receive the input sentence as voice or text, and provide the response sentence as the voice or the text.

20. The electronic apparatus as claimed in claim 11, wherein the processor is configured to provide an updated conversation sentence from among the plurality of conversation sentences based on the updated weight values, as the response sentence in reply to the input sentence of the user.

* * * * *